United States Patent
Aoki et al.

(10) Patent No.: US 7,522,479 B2
(45) Date of Patent: Apr. 21, 2009

(54) DOMAIN WALL DISPLACEMENT FOR MAGNETO-OPTICAL RECORDING MEDIUM HAVING MULTIPLE MAGNETIC LAYERS

(75) Inventors: Yukari Aoki, Yokohama (JP); Yasushi Hozumi, Ageo (JP); Kazuoki Hongu, Zushi (JP)

(73) Assignee: Canon Kabushiki Kaisha, Tokyo (JP)

( * ) Notice: Subject to any disclaimer, the term of this patent is extended or adjusted under 35 U.S.C. 154(b) by 930 days.

(21) Appl. No.: 11/041,731

(22) Filed: Jan. 25, 2005

(65) Prior Publication Data

US 2005/0169116 A1 Aug. 4, 2005

(30) Foreign Application Priority Data

Feb. 2, 2004 (JP) ............................. 2004-026082
Aug. 27, 2004 (JP) ............................. 2004-248490

(51) Int. Cl.
*G11B 11/00* (2006.01)
(52) U.S. Cl. ............... 369/13.07; 369/13.47; 369/13.46
(58) Field of Classification Search ... 369/13.06–13.09, 369/13.35, 13.43, 13.47, 13.52; 428/817, 428/818, 819.4, 827, 828.1
See application file for complete search history.

(56) References Cited

U.S. PATENT DOCUMENTS

| | | | |
|---|---|---|---|
| 6,027,825 A | 2/2000 | Shiratori et al. | 428/694 ML |
| 6,150,038 A * | 11/2000 | Hirokane et al. | 428/819.2 |
| 6,197,440 B1 * | 3/2001 | Shiratori | 428/819.3 |
| 6,338,911 B1 * | 1/2002 | Mori et al. | 428/820.6 |
| 6,399,174 B1 | 6/2002 | Shiratori et al. | 428/64.3 |
| 6,403,148 B1 | 6/2002 | Shiratori et al. | 428/128 |
| 6,747,919 B2 * | 6/2004 | Kawaguchi et al. | 369/13.47 |
| 6,767,697 B2 | 7/2004 | Uchida et al. | 430/321 |
| 6,826,131 B2 * | 11/2004 | Kawaguchi et al. | 428/819.2 |
| 6,894,954 B2 | 5/2005 | Aoki | 369/13.44 |
| 7,060,373 B2 * | 6/2006 | Sakamoto et al. | 428/819.3 |
| 7,126,884 B2 * | 10/2006 | Tabata | 369/13.08 |
| 2005/0069731 A1 * | 3/2005 | Awano et al. | 428/694 SC |

FOREIGN PATENT DOCUMENTS

| | | |
|---|---|---|
| JP | 06-290496 | 10/1994 |
| JP | 2000-187898 | 7/2000 |
| JP | 2000-207791 | 7/2000 |
| JP | 2002-150631 | 5/2002 |
| JP | 2002-203343 | 7/2002 |
| JP | 2003-317336 | 11/2003 |

* cited by examiner

*Primary Examiner*—Tan X Dinh
(74) *Attorney, Agent, or Firm*—Fitzpatrick, Cella, Harper & Scinto

(57) ABSTRACT

Provided is a magnetic domain wall displacement magneto-optical recording medium having a preferable reproducing signal characteristic. The magnetic domain wall displacement magneto-optical recording medium includes at least a magnetic domain wall displacement layer, a switching layer, and a recording layer, in which magnetic coupling between recording tracks is disconnected. An in-plane magnetized film layer is further provided adjacent to the surface of a recording layer opposite to a side of the recording layer facing the magnetic domain wall displacement layer.

3 Claims, 4 Drawing Sheets

DOMAIN WALL DISPLACEMENT FOR MAGNETO-OPTICAL RECORDING MEDIUM HAVING MULTIPLE MAGNETIC LAYERS

BACKGROUND OF THE INVENTION

1. Field of the Invention

The present invention relates to a magneto-optical recording medium, and specifically to a magneto-optical recording medium utilizing displacement of magnetic domain walls at the time of reproduction.

2. Related Background Art

Various magnetic recording media have been practically used as rewritable recording media.

In recent years, requirement for an increase in recording density of the magnetic recording medium to produce a recording medium having a larger capacity has been growing along with the progress of digitization of moving images. In particular, a magneto-optical recording medium having a magnetic thin film into which magnetic domains are written using thermal energy from a semiconductor laser to record information and from which the information is read out using a magneto-optical effect has been expected as a rewritable recording medium which is recordable at a high density and has a high capacity.

In general, the linear recording density of an optical recording medium largely depends on the wavelength of a laser of a reproducing optical system and the numerical aperture NA of the object lens thereof. That is, when a wavelength λ of the laser of the reproducing optical system and the numerical aperture NA of the object lens thereof are determined, the diameter of a beam waist is determined. Therefore, a limit of a spatial frequency of recorded pits for reproducing a signal becomes about 2 NA/λ. Thus, when a density in a conventional optical disk is to be increased, it is necessary to shorten the wavelength of the laser of the reproducing optical system or to increase the numerical aperture NA of the object lens thereof.

In view of the wavelength of the laser, a blue semiconductor laser having a short wavelength of about 405 nm and about 435 nm has been developed and practically used in contrast to a conventional red semiconductor laser having a wavelength of about 635 nm to 685 nm. However, when the wavelength of the laser is further shortened, it is within an ultraviolet range, raising a problem in that a material transmitting ultraviolet light is limited. Therefore, it is expected to become very hard to further shorten the wavelength for recording and reproducing. On the other hand, when the numerical aperture of the object lens increases, a focal depth becomes shallow in proportion to the square of the numerical aperture, so that a permissible variation in interval between a disk serving as a recording medium and a pickup, that is, a permissible runout of the disk acceleratedly reduces. As a result, a focal servo or the like is required for the pickup, so that a problem occurs in that tight requirement is made for mechanical precision.

Therefore, it is important to realize a high density without a change in numerical aperture of the object lens even when the recording density is improved by the shortening of the wavelength of the laser. Thus, various high-density techniques for improving the recording density by devising a structure of a recording medium and a reproducing method have been developed.

For example, according to Japanese Patent Application Laid-Open No. H6-290496, a magneto-optical recording medium and a reproducing method therefor have been proposed, in which a magnetic domain wall present in a boundary portion between recording marks is displaced to a high temperature side utilizing a temperature gradient, and the displacement of the magnetic domain wall is detected, whereby a signal of a recording density which exceeds resolution of an optical system can be reproduced without a reduction in amplitude of a reproducing signal.

In order to smoothly displace the magnetic domain wall, a proposal of disconnecting magnetic coupling between adjacent recording tracks has been made in, for example, Japanese Patent Application Laid-Open No. 2002-150631. According to Japanese Patent Application Laid-Open No. 2002-150631, laser annealing for irradiating a portion between the recording tracks with high-power laser light is performed to change a magnetic layer between the tracks to an in-plane magnetized film, whereby preferable reproduction in which a magnetic domain is extended due to the displacement of the magnetic domain wall is realized. According to Japanese Patent Application Laid-Open No. 2002-203343, a proposal has been made of annealing a magnetic film from an opposite side to a substrate while tracking control is performed by a sample servo system.

According to Japanese Patent Application Laid-Open No. 2003-317336, a proposal has been made of using land/groove recording to narrow a track pitch and annealing a side wall portion between a groove and a land as a recording track.

The inventors of the present invention found that a variation in reproducing signal characteristic is caused in a conventional magnetic domain wall displacement magneto-optical recording medium in which laser annealing is performed on a portion between recording tracks. As a result of pursuing this cause, the inventors determined that the following matter is likely to be a main factor. A magnetized state of the annealed region is supposed to fundamentally become an in-plane magnetized state. However, the annealed region becomes a region where a perpendicular magnetized film and an in-plane magnetized film coexist due to the influences (leakage magnetic field and exchange coupling) of magnetized states of adjacent recording tracks. In addition, the region which has become the perpendicular magnetized film is in a state that a region magnetized upward and a region magnetized downward coexist.

In other words, a variation in displacement of the magnetic domain wall is caused by a random magnetized state of the laser-annealed region, thereby resulting in a variation in reproducing signal characteristic occurs.

SUMMARY OF THE INVENTION

An object of the present invention is to provide a magnetic domain wall displacement magneto-optical recording medium capable of obtaining stable reproducing signal characteristics.

A medium structure of the present invention is as follows.

The magnetic domain wall displacement magneto-optical recording medium of the present invention includes:

a substrate;

a magnetic layer formed on the substrate, the magnetic layer including at least a first magnetic layer in which a magnetic domain wall displaces, a second magnetic layer, and a third magnetic layer for holding a recording magnetic domain according to information, wherein the second magnetic layer is located between the first magnetic layer and the third magnetic layer and has a Curie temperature lower than Curie temperatures of the first magnetic layer and the third magnetic layer;

a plurality of recording tracks formed on the magnetic layer;

a magnetic disconnecting area for disconnecting magnetic coupling between the recording tracks; and a fourth magnetic layer which is formed on an opposite side to the second magnetic layer with respect to the third magnetic layer and shows an in-plane magnetized state in a range from room temperature to a Curie temperature of the fourth magnetic layer, wherein the Curie temperature of the fourth magnetic layer is lower than the Curie temperature of the third magnetic layer, and at least the third magnetic layer and the fourth magnetic layer are exchange-coupled to each other in a range from the room temperature to the Curie temperature of the fourth magnetic layer.

DESCRIPTION OF THE PREFERRED EMBODIMENT

Hereinafter, an embodiment of the present invention will be described in detail with reference to the drawings.

First, reproduction in which a magnetic domain is extended by a displacement of a magnetic domain wall will be described.

Figure 4:
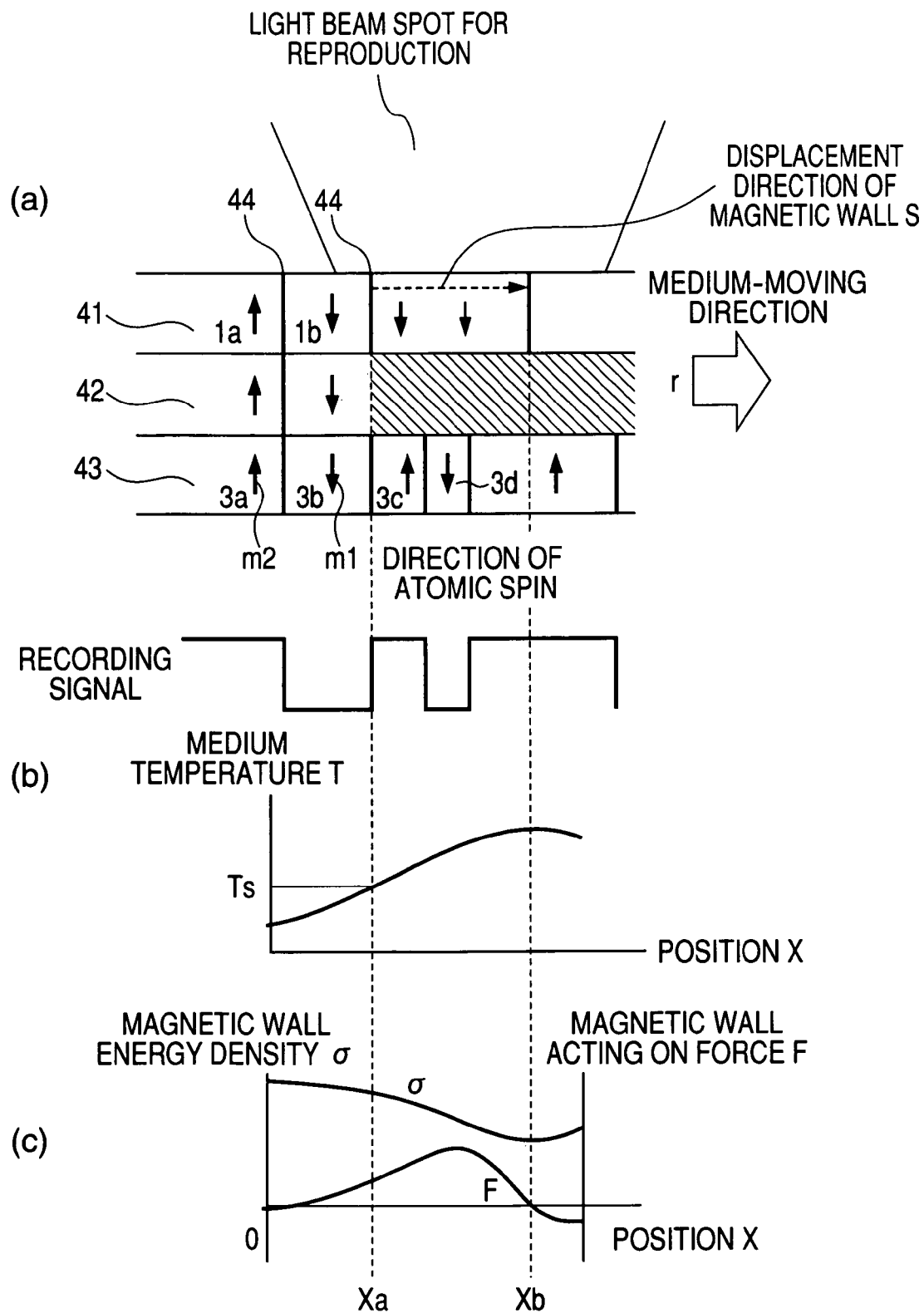
FIG. 4 is a schematic explanatory diagram showing a reproducing principle of a magnetic domain wall displacement magneto-optical recording medium.

FIG. 4 is an explanatory diagram showing a fundamental magnetic domain wall displacement magneto-optical recording medium and an information reproducing principle thereof. (a) of FIG. 4 is a schematic sectional view showing a structure of the magneto-optical recording medium and a magnetized state of a portion irradiated with a light beam for reproduction. (b) of FIG. 4 is a graph showing a temperature distribution produced in the magneto-optical recording medium at the time of laser beam irradiation. (c) of FIG. 4 is a graph showing the distribution of a magnetic domain wall energy density σ of a magnetic domain wall displacement layer and a change of drive force F1 due to a temperature gradient, which correspond to the temperature distribution shown in (b) of FIG. 4.

As shown in (a) of FIG. 4, the magneto-optical recording medium is formed by stacking a first magnetic layer (magnetic domain wall displacement layer) 41 having a small magnetic domain wall coercive force, a second magnetic layer (switching layer) 42 having a low Curie temperature, and a third magnetic layer (recording layer) 43 having a large magnetic domain wall coercive force are successively stacked on a substrate in mentioned order from the upper side. The second magnetic layer 42 has a lower Curie temperature than the first magnetic layer 41 and the third magnetic layer 43. The first magnetic layer 41, the second magnetic layer 42, and the third magnetic layer 43 are exchange-coupled at a temperature not higher than the Curie temperature of the second magnetic layer 42.

Recording magnetic domains 3a, 3b, 3c, 3d, . . . are successively formed in the third magnetic layer 43. In a region whose medium temperature is equal to or smaller than the Curie temperature Ts of the second magnetic layer 42, the first magnetic layer 41, the second magnetic layer 42, and the third magnetic layer 43 are exchange-coupled, whereby the recording magnetic domains of the third magnetic layer 43 are directly transferred as the recording magnetic domains of the first magnetic layer 41. In (a) of FIG. 4, a recording magnetic domain 1a of the first magnetic layer 41 is formed by transfer of the recording magnetic domain 3a of the third magnetic layer 43.

An arrow r in FIG. 4 indicates a medium-moving direction. While a recording layer moves in the medium-moving direction r, a light beam spot for reproduction moves along information tracks on the recording layer. As shown in (b) of FIG. 4, a region irradiated with the light beam spot for reproduction has a temperature distribution in which a temperature rises from the front side of the spot in the beam-moving direction and peaks at a position Xb. Here, a medium temperature reaches a temperature Ts close to the Curie temperature Ts of the second magnetic layer 42 at a position Xa. In order to hold the recording magnetic domains, it is preferable to set the peak temperature at the position Xb to a temperature lower than a Curie temperature of the third magnetic layer.

As shown in (c) of FIG. 4, the magnetic domain wall energy density a in the first magnetic layer 41 becomes minimum in the vicinity of the temperature peak in the rear side of the beam spot for reproduction. In addition, the closer to the front side of the spot, the larger the magnetic domain wall energy density a. Therefore, when the magnetic domain wall energy density a is gradient in a position X direction, the force F obtained from the expression (1) acts on the magnetic domain wall of each of layers which exists at a position X.

$$F = \partial \sigma / \partial X \tag{1}$$

The force F acts on the magnetic domain wall such that the magnetic domain wall is displaced to a region having a lower magnetic domain wall energy. The first magnetic layer 41 has a small magnetic domain wall coercive force and a large magnetic domain wall mobility, so that in the case of a single layer, the magnetic domain wall 44 of the first magnetic layer 41 is easily displaced by the force F. The region of the first magnetic layer 41 which is located closer to the front side of the spot than the position Xa has a medium temperature is lower than Ts and is exchange-coupled to the third magnetic layer 43 having the large magnetic domain wall coercive force. Therefore, the magnetic domain wall 44 of the first magnetic layer 41 does not displace and is held at a position corresponding to the position of a magnetic domain wall in the third magnetic layer 43 having the large magnetic domain wall coercive force.

When the magneto-optical recording medium moves in the medium-moving direction r and the magnetic domain wall 44 of the first magnetic layer 41 reaches the position Xa, the medium temperature in the magnetic domain wall 44 rises to the temperature Ts close to the Curie temperature of the second magnetic layer 42. Therefore, the exchange coupling between the first magnetic layer 41 and the third magnetic layer 43 is disconnected. As a result, the magnetic domain wall 44 of the first magnetic layer 41 is instantly displaced to a region having a higher temperature and a smaller magnetic domain wall energy density as indicated by an arrow S of a dashed line.

When the magnetic domain wall 44 passes through a region under the beam spot for reproduction, atomic spins of the first magnetic layer 41 are aligned in a single direction in a range from the position Xa to the position Xb.

Every time the magnetic domain wall reaches the position Xa with the movement of the medium, the magnetic domain wall is instantly displaced through the region under the spot. Therefore, the recording domain is extended to the range from the position Xa to the position Xb and the atomic spins of the first magnetic layer 41 are aligned in the single direction. As a result, an amplitude of a reproducing signal constantly becomes a constant and maximum amplitude regardless of an interval between recorded magnetic domain walls (that is, recording mark length). Thus, a problem such as the occurrence of wave interference due to an optical diffraction limit is relieved.

First Embodiment

Figure 1:
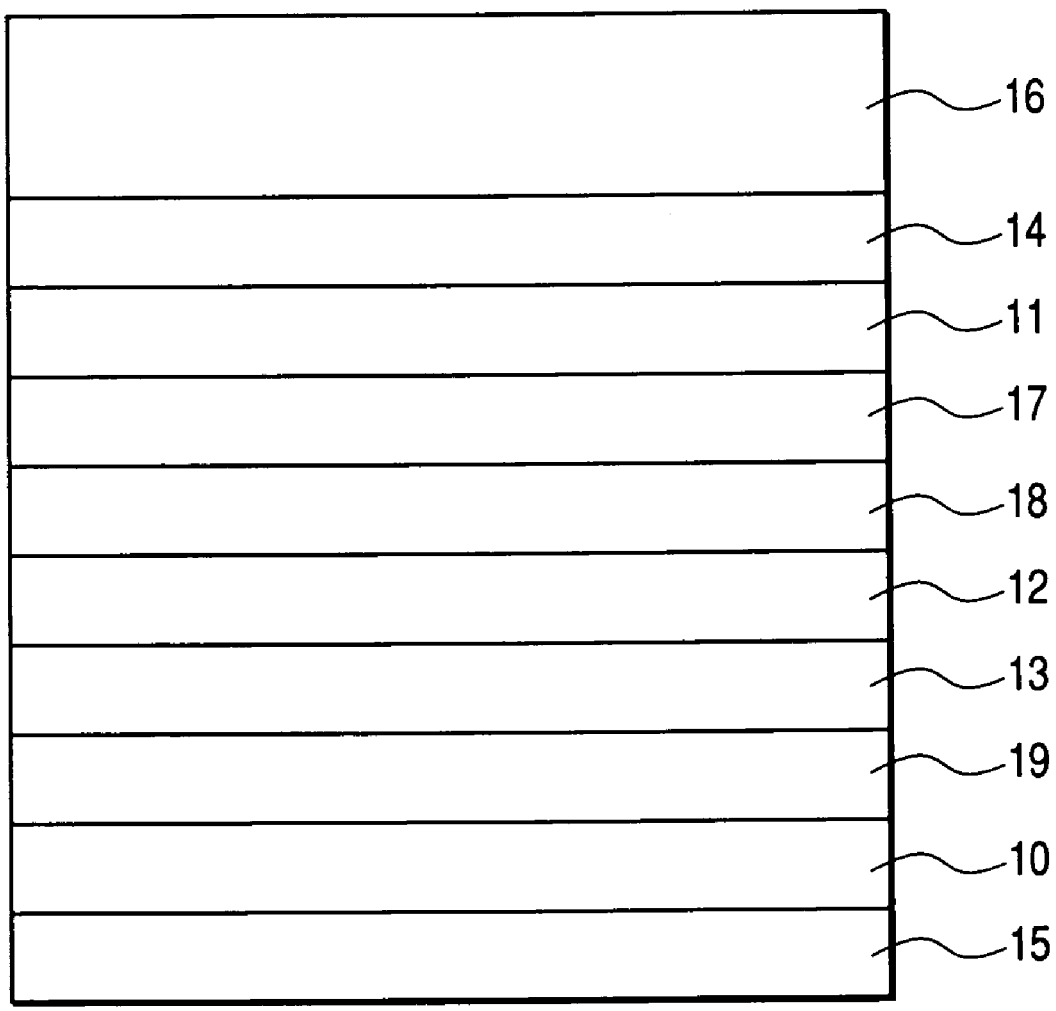
FIG. 1 is a schematic sectional view showing a magneto-optical recording medium according to an embodiment of the present invention.

FIG. 1 is a schematic sectional view showing a magneto-optical recording medium according to an embodiment of the present invention.

As shown in FIG. 1, a first dielectric layer 14, a first magnetic layer (magnetic domain wall displacement layer) 11, a magnetic domain wall displacement assisting layer 17, a control layer 18, a second magnetic layer (switching layer) 12, a third magnetic layer (recording layer) 13, a magnetic field sensitivity assisting layer 19, a fourth magnetic layer (in-plane magnetized film layer) 10, and a second dielectric layer 15 are stacked in order on a transparent substrate 16.

In the structure shown in FIG. 1, when the magnetic layers are irradiated with laser light through the substrate 16, the substrate 16 is made of a material translucent to at least a wavelength of a laser used for recording and reproduction. For example, it is preferable to use polycarbonate, APO, acrylic, glass, or the like.

On the other hand, the magnetic layers are irradiated with laser light from the magnetic layer side, a translucent material is not necessarily used for the substrate 16. In this case, the magnetic layers may be stacked in a reversed order.

It is preferable to use a translucent material such as SiN, AlN, SiO, ZnS, MgF, or TaO for each of the first dielectric layer 14 and the second dielectric layer 15.

The first dielectric layer 14 and the second dielectric layer 15 can be formed by, for example, sputtering using a magnetron sputtering apparatus or evaporation.

When an SiN layer is formed as a dielectric layer, reactive sputtering can be performed by introducing an $N_2$ gas is introduced in addition to an Ar gas. However, when the $N_2$ gas is mixed during the formation of the magnetic film, for example, the film is nitrided to thereby influence a magnetic characteristic of the film in some cases. Therefore, when the dielectric layer is formed by reactive sputtering using the $N_2$ gas, it is preferable to use a magnetron sputtering chamber different from that used for the magnetic layer.

The respective magnetic layers can also be formed by, for example, sputtering using a magnetron sputtering apparatus or evaporation.

In particular, when the respective magnetic layers are successively formed without exposure to air, the magnetic layers are exchange-coupled to one another. In this embodiment, it is preferable to successively form the magnetic layers by the same magnetron sputtering apparatus. Each of the magnetic layers can be made of various magnetic materials such as a magnetic bubble material and an antiferromagnetic material in addition to materials generally used for the magnetic recording medium and the magneto-optical recording medium. For example, each of the magnetic layers can be made of a rare earth-iron group amorphous alloy composed of one or more selected from rare earth metallic elements such as Pr, Nd, Sm, Eu, Gd, Tb, Dy, Ho, and Er at 10 atomic % to 40 atomic % and one or more selected from iron group elements such as Fe, Co, and Ni at 90 atomic % to 60 atomic %.

In order to improve a corrosion resistance, a small amount of element such as Cr, Mn, Cu, Ti, Al, Si, Pt, or In may be added to the rare earth-iron group amorphous alloy. Hereinafter, the rare earth-iron group amorphous alloy (heavy rare earth-iron group amorphous alloy) means an alloy containing at least a rare earth-iron group as a main ingredient.

It is also possible to use a platinum group-iron group periodic structural film such as a Pt/Co film or a Pd/Co film, a platinum group-iron group alloy film, an antiferromagnetic material such as Co—Ni—O or Fe—Rh based alloy, or a material such as magnetic garnet.

In the case of the heavy rare earth (64Gd to 71Lu)-iron group amorphous alloy, saturation magnetization can be controlled according to a composition ratio between the rare earth element and the iron group element. According to compensation composition, the saturation magnetization at a room temperature can be 0 emu/cc. The Curie temperature can also be controlled according to the composition ratio. When the Curie temperature is controlled independently from saturation magnetization, it is possible to more preferably utilize a method of controlling the amount of substitution using a material in which a Co element substitutes for a part of Fe elements, with respect to the iron group element. That is, when a Co element substitutes for an Fe element at 1 atomic %, the Curie temperature is expected to rise by about 5° C. to 6° C. Thus, the amount of addition of Co is adjusted based on such a relationship to obtain a desirable Curie temperature. When a slight amount of nonmagnetic element such as Cr, Ti, or Al is added, it is possible to reduce the Curie temperature. When two or more kinds of rare earth elements are used to adjust a composition ratio of those, the Curie temperature can be controlled.

The magnetic domain wall coercive force and the magnetic domain wall energy density are controlled mainly by the selection of material elements. The magnetic domain wall coercive force and the magnetic domain wall energy density can also be adjusted based on a state of the first dielectric layer formed as an underlying layer and a film formation condition such as a sputtering gas pressure. A Tb or Dy based material has large perpendicular anisotropy, a large magnetic domain wall coercive force, and a large magnetic domain wall energy density. A Gd based material has small perpendicular anisotropy, a small magnetic domain wall coercive force, and a small magnetic domain wall energy density. These property values can also be controlled by impurity addition or the like. A film thickness of each of the layers can be controlled according to a layer formation rate and a layer formation time.

More specifically, a rare earth-iron group amorphous alloy having a small magnetic domain wall coercive force, such as GdCo, GdFeCo, GdFe, or NdGdFeCo based alloy, or a bubble memory material such as garnet is preferably used for the first magnetic layer (magnetic domain wall displacement layer) 11.

The third magnetic layer (recording layer) 13 is preferably made of, for example, a rare earth-iron group amorphous alloy such as TbFeCo, DyFeCo, or TbDyFeCo based alloy. The rare earth-iron group amorphous alloy preferably has large perpendicular anisotropy, a large magnetic domain wall coercive force, and a magnetized state which can be stably maintained.

The second magnetic layer (switching layer) 12 is preferably made of, for example, a heavy rare earth-iron group amorphous alloy such as TbFe, DyFe, TbDyFe, TbFeCo, DyFeCo, or TbDyFeCo based alloy. The heavy rare earth-iron group amorphous alloy has a lower Curie temperature than that of the first magnetic layer (magnetic domain wall displacement layer) 11 and the third magnetic layer (recording layer) 13, large perpendicular anisotropy, a large magnetic domain wall coercive force, and a magnetized state which can be stably transferred. The layers from the magnetic domain wall displacement layer 11 to the third magnetic layer (recording layer) 13 are exchange-coupled to one another at a temperature equal to or smaller than the Curie temperature Ts of the second magnetic layer 12.

By the exchange-coupling of the layers including from the magnetic domain wall displacement layer 11 to the third magnetic layer (recording layer) 13, at the temperature equal to or smaller than the Curie temperature Ts of the second magnetic layer (switching layer) 12, in a temperature range equal to or smaller than the Curie temperature Ts of the second magnetic layer 12, the recording magnetic domains formed in the third magnetic layer (recording layer) 13 are directly transferred as the recording magnetic domains of the magnetic domain wall displacement layer 11.

In this embodiment, as proposed in Japanese Patent Application Laid-Open No. 2000-207791, an example in which the magnetic domain wall displacement assisting layer 17 is provided is described in view of the improvement of a reproducing characteristic. In addition to this, a composition gradient may be set in a film thickness direction or a multilayer structure in which the number of layers is further increased may be used.

It is preferably to use for the magnetic domain wall displacement assisting layer 17 a rare earth-iron group amorphous alloy having a Curie temperature is lower than that of the first magnetic layer (magnetic domain wall displacement layer) 11 and a magnetic domain wall coercive force relatively smaller than that of the first magnetic layer 11, such as GdCo, GdFeCo, GdFe, or NdGdFeCo based alloy, or a bubble memory material such as garnet.

As proposed in Japanese Patent Application Laid-Open No. 2000-187898, the control layer 18 is used to suppress an unnecessary displacement of the magnetic domain wall (ghost signal) in the rear end area of the beam spot for reproduction. The control layer 18 is preferably located between the layer in which the magnetic domain wall displaces and the second magnetic layer (switching layer) 12.

In other words, it is preferable to locate the control layer 18 between the first magnetic layer (magnetic domain wall displacement layer) 11 and the second magnetic layer (switching layer) 12. When the magnetic domain wall displacement assisting layer 17 is provided, it is preferable to locate the control layer 18 between the magnetic domain wall displacement assisting layer 17 and the second magnetic layer (switching layer) 12.

A magnetic material layer made of TbFeCo or TbDyFeCo based alloy is preferably used as the control layer 18. A Curie temperature of the control layer is lower than that of the second magnetic layer (switching layer) 12, perpendicular anisotropy thereof is large, and a magnetic domain wall coercive force thereof is larger than that of the first magnetic layer (magnetic domain wall displacement layer) 11.

The Curie temperature of the fourth magnetic layer (in-plane magnetized film layer) 10 is lower than that of the third magnetic layer (recording layer) 13 in order to eliminate an adverse influence on a recording characteristic. The fourth magnetic layer 10 shows an in-plane magnetized state in a range from room temperature to the Curie temperature of the fourth magnetic layer (in-plane magnetized film layer) 10. The fourth magnetic layer 10 is exchange-coupled to at least the third magnetic layer (recording layer) 13 in the range from room temperature to the Curie temperature of the fourth magnetic layer (in-plane magnetized film layer) 10, so that the magnetized state of a laser-annealed region of the third magnetic layer is adjusted to the in-plane magnetized state. Therefore, it is possible to suppress the conventional adverse influence of the perpendicular magnetized state present in the laser-annealed region on the magnetic domain wall displacement.

When in the above-described exchange-coupling state the perpendicular magnetized state of the third magnetic layer on a recording track is changed to the in-plane magnetized state, recording information is lost. Therefore, it is required that an exchange coupling force between the third magnetic layer and the fourth magnetic layer satisfies the following conditions.

1. The perpendicular magnetized state of the third magnetic layer on the recording track is not adjusted to the in-plane magnetized state.

2. The magnetized state of the laser-annealed region of the third magnetic layer is adjusted to the in-plane magnetized state.

The coercive force of the laser-annealed region becomes lower than that of a region which is not laser-annealed, so that both of the above two conditions can be satisfied. The exchange-coupling force and the coercive force of the third magnetic layer can be adjusted according to a composition and film thickness of the third magnetic layer and a composition and film thickness of the fourth magnetic layer.

In order to prevent a reduction in magnetic field sensitivity at the time of recording, it is preferable that the Curie temperature of the fourth magnetic layer (in-plane magnetized film layer) 10 is lower than that of the third magnetic layer (recording layer) 13 by 40° C. or more.

When total saturation magnetization of the layers including from the first magnetic layer (magnetic domain wall displacement layer) 11 to the magnetic field sensitivity assisting layer 19, except for the fourth magnetic layer (in-plane magnetized film layer) 10, in the vicinity of a reproducing temperature is large, a variation in duty of a reproducing signal is caused by the influence of a leakage magnetic field from an adjacent track and the influence of a leakage magnetic field from an own track, whereby this becomes the cause of readout error.

In order to suppress the adverse influence of the leakage magnetic field at the time of reproduction, it is preferable to adjust a composition of the fourth magnetic layer (in-plane magnetized film layer) 10 such that total saturation magnetization of the layers including from the first magnetic layer (magnetic domain wall displacement layer) 11 to the fourth magnetic layer (in-plane magnetized film layer) 10 becomes smaller than that of the layers including from the first magnetic layer (magnetic domain wall displacement layer) 11 to the magnetic field sensitivity assisting layer 19.

Specifically, a composition of the fourth magnetic layer (in-plane magnetized film layer) 10 is preferably adjusted such that sublattice magnetization of a rare earth element is dominant, when the total saturation magnetization of the layers including from the first magnetic layer (magnetic domain wall displacement layer) 11 to the magnetic field sensitivity assisting layer 19, except for the fourth magnetic layer (in-plane magnetized film layer) 10, is dominantly sublattice magnetization of a transition metal element in a temperature range from the vicinity of the Curie temperature of the second magnetic layer (switching layer) 12 which is a magnetic domain wall displacement start temperature of the first magnetic layer (magnetic domain wall displacement layer) 11 to a maximum temperature of the spot for reproduction which is a magnetic domain wall displacement end temperature. On the other hand, the composition of the fourth magnetic layer (in-plane magnetized film layer) 10 is preferably adjusted such that the sublattice magnetization of the transition metal element is dominant, when the total saturation magnetization of the layers including from the first magnetic layer (magnetic domain wall displacement layer) 11 to the magnetic field sensitivity assisting layer 19, except for the fourth magnetic layer (in-plane magnetized film layer) 10, is dominantly the sublattice magnetization of the rare earth element in the temperature range from the vicinity of the Curie temperature of the second magnetic layer (switching layer) 12 which is the magnetic domain wall displacement start temperature of the first magnetic layer (magnetic domain wall displacement layer) 11 to the maximum temperature of the spot for reproduction which is the magnetic domain wall displacement end temperature. It is preferable to use a magnetic film made of a rare earth-iron group amorphous alloy such as GdFe, GdFeCo, or GdDyFeCo based alloy as the fourth magnetic layer (in-plane magnetized film layer) 10.

When the above-mentioned structure is used, the composition of the fourth magnetic layer (in-plane magnetized film layer) 10 becomes a composition having magnetization which cancels the total saturation magnetization of the respective magnetic layers except for the fourth magnetic layer. As a result, the total saturation magnetization of the layers including from the first magnetic layer (magnetic domain wall displacement layer) 11 to the fourth magnetic layer (in-plane magnetized film layer) 10 becomes smaller than that of the layers including from the first magnetic layer (magnetic domain wall displacement layer) 11 to the magnetic field sensitivity assisting layer 19.

In this embodiment, the example in which the magnetic field sensitivity assisting layer 19 is provided between the third magnetic layer (recording layer) 13 and the fourth magnetic layer (in-plane magnetized film layer) 10 is described in view of a recording characteristic. When the third magnetic layer (recording layer) 13 and the fourth magnetic layer (in-plane magnetized film layer) 10 are exchange-coupled, an additional layer such as a recording magnetic field sensitivity assisting layer may be provided between the third magnetic layer (recording layer) 13 and the fourth magnetic layer (in-plane magnetized film layer) 10.

It is preferably to use for the magnetic field sensitivity assisting layer 19 a rare earth-iron group amorphous alloy having a Curie temperature higher than the Curie temperature of the third magnetic layer (recording layer) 13 which is a recording temperature, and small perpendicular anisotropy and magnetic domain wall coercive force in order to easily reverse magnetization according to a magnetic field applied at the time of recording, such as GdCo, GdFeCo, GdFe, NdGdFeCo based alloy, or a bubble memory material such as garnet.

Here, the film thickness of each of the magnetic layers can be selected such that the film thickness provides a suitable characteristic. The composition of each of the magnetic layers can also be selected such that the composition provides a suitable characteristic.

A metallic layer made of Al, AlTa, AlTi, AlCr, AlSi, Cu, Pt, Au, or the like may be further provided to the above-mentioned structure to adjust a thermal characteristic (not shown). A protective film made of a polymer resin may be provided on the above-mentioned structure. In the case of light modulation recording, the substrate after the film formation may be bonded on the above-mentioned structure. The layers other than the magnetic layers may not necessarily be used, and the stack order of the magnetic layers may be reversed. Here, it is desirable to perform annealing before the formation of the metallic layer.

In order to disconnect magnetic coupling between the recording tracks in the magnetic domain wall displacement magneto-optical recording medium produced above before recording, laser annealing is performed using high-power laser light.

Figure 3:
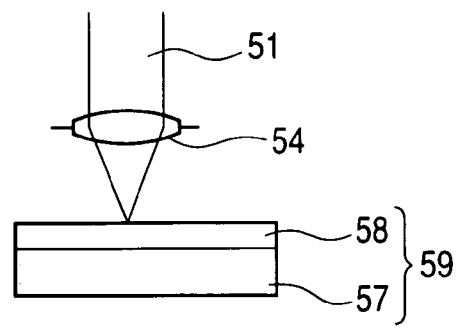
FIG. 3 is a schematic view showing an example of an optical system with which an annealing apparatus is provided.

FIG. 3 is a schematic view showing an example of an optical system with which an annealing apparatus is provided.

Figure 5:
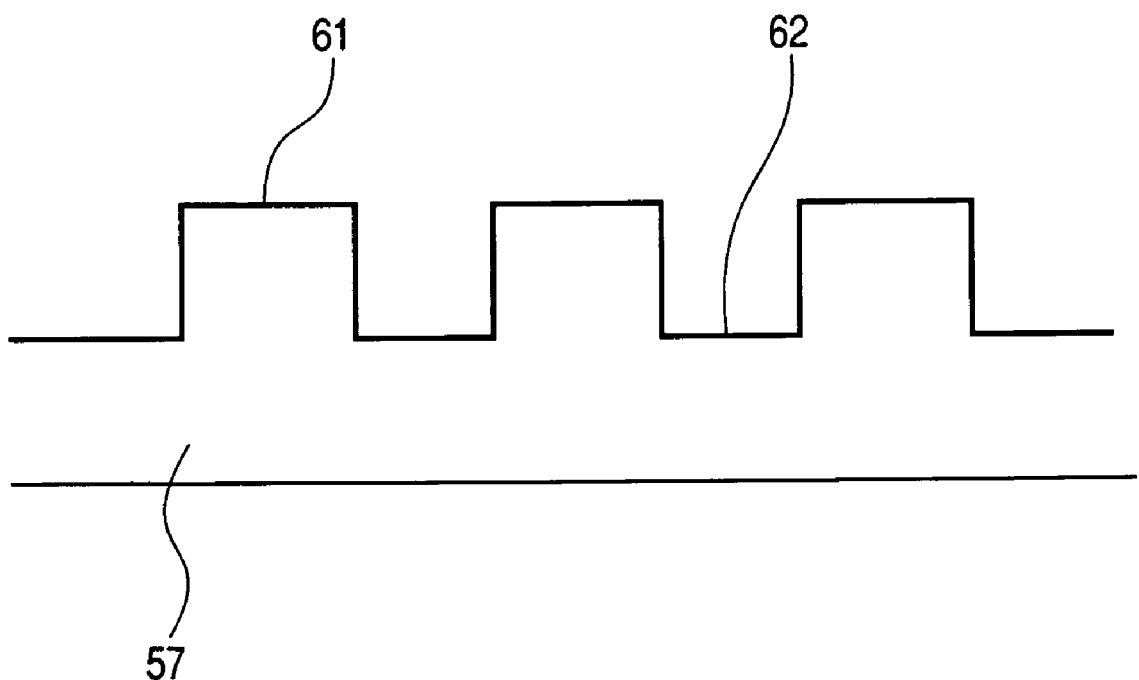
FIG. 5 is a schematic sectional view showing a land and a groove which are formed on the magneto-optical recording medium.

A magneto-optical recording medium 59 is composed of a substrate 57 and a recording film 58. As shown in FIG. 5 (the recording film 58 is not shown), convex lands 61 and concave grooves 62 are formed on the substrate 57. In this embodiment, land/groove recording for performing recording on the lands 61 and the grooves 62 is used.

In order to disconnect magnetic coupling between the land 61 and the groove 62 which become recording tracks, a side wall portion between the land 61 and the groove 62 is annealed. In order to perform this annealing, it is preferable to reduce a beam diameter by using a laser having a wavelength shorter than that of a red laser for recording and reproduction. In this embodiment, a wavelength $\lambda$ of laser light 51 for laser annealing is set to 405 nm and a numerical aperture NA of an objective lens 54 is set to 0.85. While the magneto-optical recording medium is rotated at a desirable linear speed, the laser light 51 having a desirable power and emitted from the side of the recording film 58 is focused on a magnetic film corresponding the side wall portion between the land 61 and the groove 62 which compose the recording tracks, and continuous irradiation is performed. Therefore, the side wall portion between the land 61 and the groove 62 which become the recording tracks is laser-annealed.

This annealing reduces the perpendicular magnetic anisotropy energy of the magnetic film corresponding to the side wall portion which is a magnetic disconnection area to thereby disconnect the magnetic coupling between the recording tracks. In this embodiment, the land/groove recording is used and the laser light is focused for annealing on the side wall portion between the land and the groove which are the recording tracks. However, the present invention is not limited to this. In the case of land recording, a groove between adjacent lands can be annealed to disconnect the magnetic coupling between the recording tracks. In the case of groove recording, a land between adjacent grooves can be annealed to disconnect the magnetic coupling between the recording tracks.

In this embodiment, the method of emitting laser light from the film side to perform annealing is used. However, the present invention is not limited to the above-described annealing method. Laser annealing can be performed through the substrate using high-power laser light.

Even when the perpendicular magnetic anisotropy of the magnetic disconnection area is reduced by, for example, controls of a film thickness, a film composition, and a substrate groove shape without the laser annealing, the same effect can be obtained by the application of the present invention.

Recording of a data signal on the magnetic recording medium of the present invention is performed by forming a recording magnetic domain corresponding to information in the third magnetic layer (recording layer) 13 by magnetic recording or thermomagnetic recording. With respect to the thermomagnetic recording, there is a method of modulating an external magnetic field while the medium is irradiated with laser light having power by which the third magnetic layer (recording layer) 13 is heated to the Curie temperature or higher in a state in which the medium is moving. In addition, there is a method of modulating laser light power while a reverse (recording) magnetic field is applied to a medium magnetized (erased) in a predetermined direction before recording.

Figure 2:
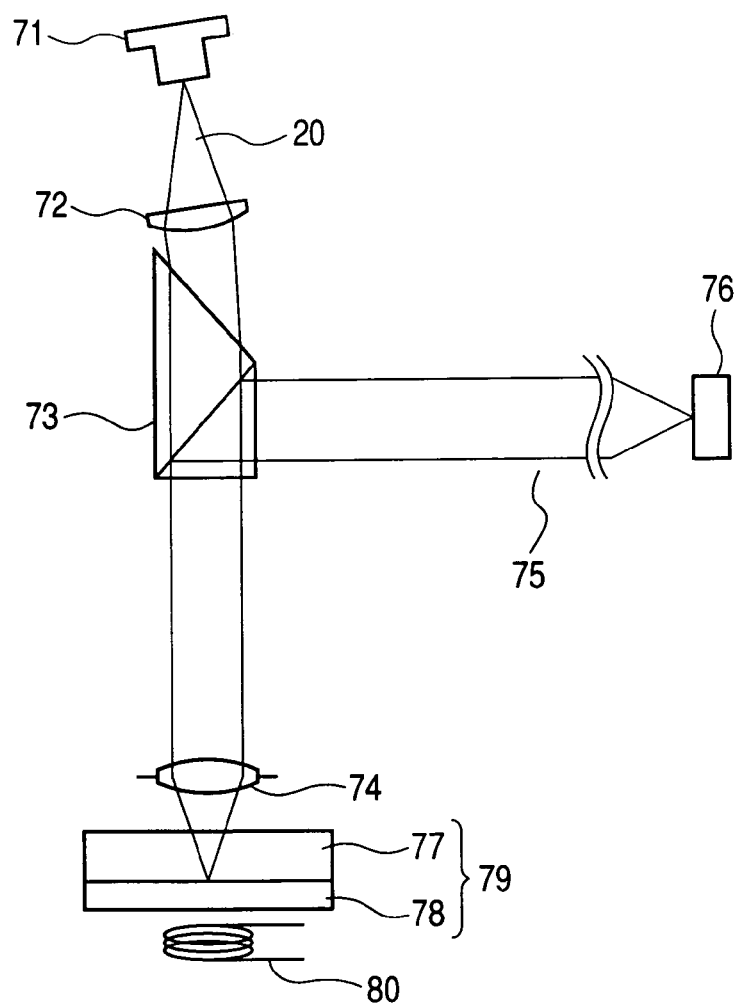
FIG. 2 is a schematic view showing an example of an optical system with which a recording and reproducing apparatus is provided.

FIG. 2 is a schematic view showing an example of an optical system with which a recording and reproducing apparatus for recording and reproducing the data signal on and from the magneto-optical recording medium according to this embodiment is provided.

As shown in FIG. 2, the optical system includes: a recording and reproducing laser light source 71 that emits laser light 20; a collimator lens 72 that converts the laser light 20 emitted from the recording and reproducing laser light source 71 into parallel light; a beam splitter 73 with a beam shaping portion, which transmits the laser light 20 emitted from the recording and reproducing laser light source 71 and reflects return light from a magneto-optical recording medium 79; an objective lens 74 that condenses the laser light 20 transmitting through the beam splitter 73 with beam shaping portion to the magneto-optical recording medium 79; and a signal detecting system 75 having a detector 76 that receives the return light reflected by the beam splitter 73 with beam shaping portion; which are disposed in mentioned order on an optical path. The recording and reproducing laser light source 71 is a light source for recording and reproduction. A wavelength of the laser light 20 is 650 nm and a numerical aperture NA of the objective lens 74 is 0.6. The beam splitter 73 with beam shaping portion has a shaping portion that shapes the laser light 20.

In the recording and reproducing apparatus provided with the optical system having the above-mentioned structure, the laser light 20 emitted from the recording and reproducing laser light source 71 is condensed onto a groove (or land) of a recording surface of the magneto-optical recording medium, thereby forming a beam spot for recording and reproduction. In the case of recording the data signal, while the magneto-optical recording medium is moved at a desirable linear speed, a beam spot for recording is formed thereon, and simultaneously, an external magnetic field is generated using a magnetic field generating coil 80 and the orientation of the external magnetic field is changed by high frequency according to the data signal, thereby forming a recording magnetic domain.

The reproduction of the data signal is performed using a beam spot for reproduction while the magneto-optical recording medium is moved at a desirable linear speed. Thus, at the time of reproduction, the magneto-optical recording medium can be heated at a temperature gradient as shown in (b) of FIG. 4.

EXAMPLE 1

In this example, the substrate 16 for land/groove recording was prepared by injection molding using polycarbonate. The substrate having a land width of 0.61 μm, a groove width of 0.47 μm and a groove depth of 35 nm was used.

An SiN layer was formed by DC reactive sputtering using an $N_2$ gas as an introducing gas in addition to an Ar gas. When the $N_2$ gas was mixed during the formation of the magnetic film, for example, the film was nitrided to thereby influence a magnetic characteristic of the film. Therefore, the dielectric layer and the other magnetic layer were formed by DC magnetron sputtering chamber different from that used for the SiN layer.

A target of Si doped with B (boron) was set in a DC magnetron sputtering chamber for forming the SiN layer. Respective targets of Gd, Tb, FeCr, and CoCr were set in a DC magnetron sputtering chamber for forming the magnetic layers. The substrate 16 was held in a substrate holder and then placed in the corresponding DC magnetron sputtering chamber. A chamber of the corresponding DC magnetron sputtering apparatus was evacuated up to the degree of vacuum of $2 \times 10^{-5}$ Pa or less by a cryopump. After that, the Ar gas and/or the $N_2$ gas were introduced into the chamber while vacuum-evacuating. The SiN layer and the magnetic layers were formed by sputtering using the corresponding target while rotating the substrate 16.

First, the Ar gas and the $N_2$ gas were introduced into the chamber. A pressure of the chamber was set to a desirable value by conductance adjustment. An SiN layer having a thickness of 35 nm was formed as the first dielectric layer. After the formation of the first dielectric layer, the substrate 16 was transferred to another chamber and the Ar gas was introduced thereinto. A pressure of the chamber was set to a desirable value by conductance adjustment. A GdFeCoCr layer having a thickness of 18 nm was formed as the first magnetic layer (magnetic domain wall displacement layer) 11. A GdFeCr layer having a thickness of 18 nm was formed as the magnetic domain wall displacement assisting layer 17. Next, similarly, the Ar gas was used and the pressure of the chamber was set to a desirable value by conductance adjustment. A TbFeCoCr layer having a thickness of 18 nm was formed as the control layer 18. A TbFeCr layer having a thickness of 10 nm was formed as the second magnetic layer (switching layer) 12. A TbFeCoCr layer having a thickness of 40 nm was formed as the third magnetic layer (recording layer) 13. A GdFeCoCr layer having a thickness of 13 nm was formed as the magnetic field sensitivity assisting layer 19. A GdFeCr layer having a thickness of 13 nm was formed as the fourth magnetic layer (in-plane magnetized film layer) 10.

Finally, an SiN layer having a thickness of 50 nm was formed as the second dielectric layer 15 by DC reactive sputtering in the same manner as in the case of formation of the first dielectric layer.

A composition ratio of each of the magnetic layers was controlled according to a ratio of powers supplied to the respective targets of Gd, Tb, FeCr, and CoCr.

Specifically, a composition of the first magnetic layer (magnetic domain wall displacement layer) 11 was adjusted such that its Curie temperature was about 300° C. and sublattice magnetization of a rare earth element became dominant in a range from room temperature to the Curie temperature. A composition of the magnetic domain wall displacement assisting layer 17 was adjusted such that its Curie temperature was about 215° C. and sublattice magnetization of a transition metal element became dominant in a range from room temperature to the Curie temperature. A composition of the control layer 18 was adjusted such that its Curie temperature was about 185° C. and the sublattice magnetization of the rare earth element became dominant in a range from room temperature to the Curie temperature. A composition of the second magnetic layer (switching layer) 12 was adjusted such that its Curie temperature was about 165° C. and a compensation temperature became 140° C. A composition of the third magnetic layer (recording layer) 13 was adjusted such that its Curie temperature was about 330° C. and the sublattice magnetization of the transition metal element became dominant in a range from room temperature to the Curie temperature. A composition of the magnetic field sensitivity assisting layer 19 for a recording magnetic field was adjusted such that its Curie temperature was 415° C. and the compensation temperature became 300° C.

Here, the temperature dependence of the total saturation magnetization of each of the stacked magnetic layers including from the first magnetic layer (magnetic domain wall displacement layer) to the recording assisting layer, except for the fourth magnetic layer (in-plane magnetized film layer) 10 in Example 1, was measured using a vibrating sample magnetometer (VSM). At this time, a sample in which the respective magnetic layers including from the first magnetic layer (magnetic domain wall displacement layer) 11 to the magnetic field sensitivity assisting layer 19, except for the fourth magnetic layer (in-plane magnetized film layer) 10 in Example 1, were stacked on a glass substrate was used such that the temperature dependence could be measured even at a high temperature. As a result, the sublattice magnetization of the rare earth element was dominant at room temperature. The magnetization became zero in the vicinity of 100° C. The sublattice magnetization of the transition metal element became dominant in a range from the vicinity of 100° C. to the Curie temperature of the third magnetic layer (recording layer) 13. Therefore, it was found that the sublattice magnetization of the transition metal element was dominant in the vicinity of 165° C. which was the Curie temperature of the second magnetic layer (switching layer) 12 and which was the reproducing temperature.

Thus, a composition of the fourth magnetic layer (in-plane magnetized film layer) 10 in this example was adjusted such that its Curie temperature became about 260° C. and the total saturation magnetization of the layers including from the first magnetic layer (magnetic domain wall displacement layer) 11 to the fourth magnetic layer (in-plane magnetized film layer) 10 was reduced to a value smaller than that of the respective stacked layers including from the first magnetic layer (magnetic domain wall displacement layer) 11 to the magnetic field sensitivity assisting layer 19 to become the sublattice magnetization of the rare earth element dominant in a range from room temperature to the Curie temperature of the fourth magnetic layer (in-plane magnetized film layer) 10.

In order to disconnect magnetic coupling between the recording tracks of the magnetic domain wall displacement magneto-optical recording medium produced above before recording, laser annealing was performed by the optical system shown in FIG. 3 using high-power laser light. The wavelength λ of laser light 51 for laser annealing was set to 405 nm and the numerical aperture NA of the objective lens 54 was set to 0.85. While the magneto-optical recording medium was rotated at linear speed of 4.5 m/s, the laser light 51 for laser annealing emitted from the side of the recording film 58 was focused on the side wall portion between the land and the groove which formed the recording tracks. Continuous irradiation using laser power of 5.8 mW was performed for laser annealing.

According to such annealing, the perpendicular magnetic anisotropy energy of the magnetic film corresponding to the side wall portion which was the magnetic disconnection area reduced. Therefore, the magnetic coupling between the recording tracks significantly weakened, so that the recording tracks became a disconnected state.

A recording and reproducing characteristic of the magneto-optical recording medium thus produced was evaluated using random data with linear recording density of 0.08 µm/bit (1-7) modulation by using the optical system shown in FIG. 2 in conditions that the laser wavelength was 650 nm, NA of the objective lens was 0.06, and the linear speed was 2.4 m/s.

An evaluation index was an error ratio of reproducing data to recording data, a so-called bit error rate bER.

Recording was performed by applying a magnetic field according to a recording signal during a cooling process after the magneto-optical recording medium was heated to a temperature equal to or higher than the Curie temperature of the third magnetic layer (recording layer) by the irradiation of pulse light. The pulse light for recording was modulated using binary values of a recording power level and a 0 level. A width of a pulse indicating the recording power level was set to a time width corresponding to 50% of a clock period of the recording signal. On the other hand, reproduction was performed using DC light under the conditions that the recording power at a land portion was 6.4 mW, the modulation magnetic field strength ws 200 (Oe), the reproducing power was 2.4 mW, the recording power at a groove portion was 6.4 mW, the modulation magnetic field strength was 200 (Oe), and the reproducing power was 2.3 mW.

The measurement was performed for comparison between bERs. The bER at the land became $2 \times 10^{-5}$ and the bER at the groove became $1 \times 10^{-5}$, so that preferable characteristics were obtained with respect to both the land and the groove (Comparative Example 1).

In Comparative Example 1, a magneto-optical recording medium having the same structure as that in Example 1 was produced except that the fourth magnetic layer (in-plane magnetized film layer) 10 was omitted. Next, the laser annealing and the evaluation of the recording and reproducing characteristic were performed in the same manner as in Example 1. The laser power at the time of annealing reduced because a total film thickness was thinned by the omission of the fourth magnetic layer (in-plane magnetized film layer) 10. Therefore, the laser annealing was performed at 5.6 mW.

As a result, the bER at the land became $1 \times 10^{-4}$ and the bER at the groove became $3 \times 10^{-5}$, so that the bER at each of the land and the groove increased.

EXAMPLE 2

In Example 2, a magneto-optical recording medium having the same structure as that in Example 1 was produced except that the Curie temperature of the fourth magnetic layer (in-plane magnetized film layer) 10 was set to 290° C. and a GdFeCoCr layer was used as the fourth magnetic layer (in-plane magnetized film layer) 10. Next, the laser annealing and the evaluation of the recording and reproducing characteristic were performed in the same manner as in Example 1. The laser power at the time of annealing was 5.8 mW.

At this time, a modulation magnetic field strength at the time of recording was 220 (Oe) at each of the land and the groove. When recording was performed at the modulation magnetic field strength or more, a recording magnetic field sensitivity characteristic showed a saturation value and the best bER was obtained at the modulation magnetic field strength or more. As a result, the bER at the land became $2 \times 10^{-5}$ and the bER at the groove became $1 \times 10^{-5}$, so that preferable characteristics were obtained with respect to both the land and the groove.

EXAMPLE 3

In Example 3, a magneto-optical recording medium having the same structure as that in Example 1 was produced except that the Curie temperature of the fourth magnetic layer (in-plane magnetized film layer) 10 was set to 300° C. and a GdFeCoCr layer was used as the fourth magnetic layer (in-plane magnetized film layer) 10. Next, the laser annealing and the evaluation of the recording and reproducing characteristic were performed in the same manner as in Example 1. The laser power at the time of annealing was 5.8 mW. At this time, the modulation magnetic field strength at the time of recording was 300 (Oe) at each of the land and the groove. When recording was performed at the modulation magnetic field strength or more, a recording magnetic field sensitivity characteristic showed a saturation value and the best bER was obtained at the modulation magnetic field strength or more. As a result, the bER at the land became $2 \times 10^{-5}$ and the bER at the groove became $1 \times 10^{-5}$, so that preferable characteristics were obtained with respect to both the land and the groove.

Here, when the modulation magnetic field strength at the time of recording was 220 (Oe) at each of the land and the groove, the bER at the land became $5 \times 10^{-5}$ and the bER at the groove became $4 \times 10^{-5}$, so that the bER at each of the land and the groove increased.

From the results in Examples 1 to 3, it was found that when the Curie temperature of the fourth magnetic layer (in-plane magnetized film layer) increased, the recording magnetic field sensitivity reduced.

The present invention is described in detail with reference to the specific examples. Various alterations and modifications can be made by a person skilled in the art without departing from the gist of the present invention.

This application claims priority from Japanese Patent Application No. 2004-026082 filed Feb. 2, 2004 and No. 2004-248490 filed Aug. 27, 2004 which are hereby incorporated by reference herein.

What is claimed is:

1. A magnetic domain wall displacement magneto-optical recording medium, comprising:

a substrate;

a magnetic layer formed on the substrate, the magnetic layer including a least a first magnetic layer in which a magnetic domain wall displaces, a second magnetic layer, and a third magnetic layer for holding a recording magnetic domain according to information, wherein the second magnetic layer is located between the first magnetic layer and the third magnetic layer and has a Curie temperature lower than Curie temperatures of the first magnetic layer and the third magnetic layer;

a plurality of recording tracks formed on the magnetic layer;

a magnetic disconnecting area for disconnecting magnetic coupling between the recording tracks; and a fourth magnetic layer which is formed on an opposite side to the second magnetic layer with respect to the third magnetic layer and shows an in-plane magnetized state in a range from room temperature to a Curie temperature of the fourth magnetic layer, wherein the Curie temperature of the fourth magnetic layer is lower than the Curie temperature of the third magnetic layer;

wherein at least the third magnetic layer and the fourth magnetic layer are exchange-coupled to each other in a range from the room temperature to the Curie temperature of the fourth magnetic layer; and wherein in a temperature range from a vicinity of the Curie temperature of the second magnetic layer which is a magnetic domain wall displacement start temperature of the first magnetic layer to a maximum temperature of a spot for reproduction which is a magnetic domain wall displacement end temperature, total saturation magnetization of stacked layers composed of at least the fourth magnetic layer, the first magnetic layer, the second magnetic layer and the third magnetic layer is smaller than total saturation magnetization of stacked layers composed of at least the first magnetic layer, the second magnetic layer and the third magnetic layer.

2. A magnetic domain wall displacement magneto-optical recording medium according to claim 1, wherein when the total saturation magnetization of the stacked layers composed of at least the first magnetic layer, the second magnetic layer and the third magnetic layer is dominantly sublattice magnetization of a transition metal element in the temperature range, the fourth magnetic layer has a composition in which sublattice magnetization of a rare earth element is dominant.

3. A magnetic domain wall displacement magneto-optical recording medium according to claim 1, wherein when the total saturation magnetization of the stacked layers composed of at least the first magnetic layer, the second magnetic layer and the third magnetic layer is dominantly sublattice magnetization of a rare earth element in the temperature range, the fourth magnetic layer has a composition in which sublattice magnetization of a transition metal element is dominant.

* * * * *